United States Patent
Lutjen et al.

(10) Patent No.: US 10,550,706 B2
(45) Date of Patent: Feb. 4, 2020

(54) WRAPPED DOG BONE SEAL

(71) Applicant: UNITED TECHNOLOGIES CORPORATION, Farmington, CT (US)

(72) Inventors: Paul M. Lutjen, Kennebunkport, ME (US); Mark J. Rogers, Kennebunk, ME (US)

(73) Assignee: United Technolgies Corporation, Farmington, CT (US)

(*) Notice: Subject to any disclaimer, the term of this patent is extended or adjusted under 35 U.S.C. 154(b) by 693 days.

(21) Appl. No.: 15/038,570

(22) PCT Filed: Oct. 24, 2014

(86) PCT No.: PCT/US2014/062075
§ 371 (c)(1),
(2) Date: May 23, 2016

(87) PCT Pub. No.: WO2015/088656
PCT Pub. Date: Jun. 18, 2015

(65) Prior Publication Data
US 2016/0298476 A1 Oct. 13, 2016

Related U.S. Application Data

(60) Provisional application No. 61/915,066, filed on Dec. 12, 2013.

(51) Int. Cl.
*F01D 11/00* (2006.01)
*F16J 15/08* (2006.01)
(Continued)

(52) U.S. Cl.
CPC .............. *F01D 11/005* (2013.01); *F01D 9/04* (2013.01); *F01D 11/08* (2013.01);
(Continued)

(58) Field of Classification Search
CPC .......... F01D 11/005; F01D 9/04; F01D 11/08; F01D 11/001; F16J 15/0887;
(Continued)

(56) References Cited

U.S. PATENT DOCUMENTS 3,554,567 A * 1/1971 Carroll et al. ......... F16J 15/106
277/641
4,081,647 A * 3/1978 Torrey ................... H05B 6/763
174/351

(Continued)

FOREIGN PATENT DOCUMENTS

| EP | 1387044 A2 | 2/2004 |
| EP | 2589757 A2 | 5/2013 |

OTHER PUBLICATIONS

International Preliminary Report on Patentability for International Application No. PCT/US2014/062075 dated Jun. 23, 2016.
(Continued)

*Primary Examiner* — David E Sosnowski
*Assistant Examiner* — Eric J Zamora Alvarez
(74) *Attorney, Agent, or Firm* — Carlson, Gaskey & Olds, P.C.

(57) ABSTRACT

A seal for a gas turbine engine comprises a seal body extending from a first end to a second end. A wrap extends at least partially around the first and second ends of the seal body. A gas turbine engine is also disclosed.

22 Claims, 2 Drawing Sheets

(51) Int. Cl.
*F01D 9/04* (2006.01)
*F01D 11/08* (2006.01)

(52) U.S. Cl.
CPC ....... *F16J 15/0887* (2013.01); *F05D 2220/32* (2013.01); *F05D 2230/54* (2013.01); *F05D 2240/11* (2013.01); *F05D 2240/80* (2013.01); *F05D 2250/70* (2013.01); *F05D 2300/10* (2013.01)

(58) Field of Classification Search
CPC ............. F05D 2230/54; F05D 2240/11; F05D 2240/80; F05D 2250/70; F05D 2300/10; F05D 2240/57; F05D 2220/32
See application file for complete search history.

(56) References Cited

U.S. PATENT DOCUMENTS

| | | | | |
|---|---|---|---|---|
| 4,537,024 A * | 8/1985 | Grosjean | ............... | F01D 11/005 415/139 |
| 4,548,429 A * | 10/1985 | Merz | ............... | F16L 27/107 277/616 |
| 4,902,198 A * | 2/1990 | North | ............... | F01D 9/04 415/115 |
| 5,129,783 A * | 7/1992 | Hayton | ............... | F01D 5/284 415/209.2 |
| 5,158,430 A * | 10/1992 | Dixon | ............... | F01D 11/005 415/134 |
| 5,228,255 A * | 7/1993 | Hahn | ............... | F16L 51/022 277/316 |
| 5,609,469 A | 3/1997 | Worley et al. | | |
| 5,624,227 A * | 4/1997 | Farrell | ............... | F01D 11/005 277/644 |
| 5,639,100 A * | 6/1997 | Garrigues | ............... | F16J 15/0893 277/614 |
| 5,934,687 A * | 8/1999 | Bagepalli | ............... | F01D 11/005 277/637 |
| 5,975,844 A * | 11/1999 | Milazar | ............... | F01D 11/005 277/643 |
| 6,431,825 B1 * | 8/2002 | McLean | ............... | F01D 11/005 277/644 |
| 6,722,846 B2 * | 4/2004 | Burdgick | ............... | F01D 11/005 415/139 |
| 6,857,849 B2 * | 2/2005 | Hirst | ............... | F01D 11/005 277/626 |
| 6,971,844 B2 * | 12/2005 | Burdgick | ............... | F01D 11/005 415/139 |
| 7,527,472 B2 * | 5/2009 | Allen | ............... | F01D 11/008 277/648 |
| 7,744,096 B2 * | 6/2010 | Kono | ............... | F01D 11/005 277/644 |
| 8,123,232 B2 * | 2/2012 | Fujimoto | ............... | F01D 9/023 277/644 |
| 2003/0165381 A1 | 9/2003 | Fokine et al. | | |
| 2005/0225036 A1 | 10/2005 | Inciong et al. | | |
| 2006/0055118 A1 | 3/2006 | Beichl | | |
| 2009/0208322 A1 | 8/2009 | McCaffrey | | |
| 2010/0247005 A1 | 9/2010 | Aschenbruck et al. | | |
| 2012/0171022 A1 | 7/2012 | Hafner | | |
| 2012/0189435 A1 * | 7/2012 | Morgan | ............... | C04B 14/20 415/174.2 |
| 2013/0084166 A1 * | 4/2013 | Klingels | ............... | F01D 11/005 415/173.1 |
| 2013/0106066 A1 | 5/2013 | Sarawate et al. | | |
| 2013/0207351 A1 | 8/2013 | Milazar | | |
| 2014/0117629 A1 * | 5/2014 | Biallas | ............... | C23C 14/20 277/653 |

OTHER PUBLICATIONS

Supplementary European Search Report for European Application No. 14869634.7 dated Jul. 13, 2017.
European Office Action for European Application No. 14869634.7, dated Jun. 26, 2018.
International Search Report and Written Opinion for PCT Application No. PCT/US2014/062075, dated Feb. 4, 2015.

* cited by examiner

WRAPPED DOG BONE SEAL

CROSS-REFERENCE TO RELATED APPLICATION

This application claims priority to U.S. Provisional Patent Application No. 61/915,066, filed 12 Dec. 2013.

BACKGROUND OF THE INVENTION

Gas turbine engines include one or more turbine stages. Each stage includes a plurality of blades mounted to a disc that is fixed for rotation with a turbine shaft. Adjacent to each set of blades is a set of vanes that are fixed to an engine casing. Blade outer air seals (BOAS) are positioned radially outward of tips of the blades and extend between adjacent sets of vanes. Seals extend between the vanes and the blade outer air seals to facilitate sealing the gas path.

Seals that are located close to the gas path are susceptible to wear. Loss of material due to wear can degrade the seal and reduce sealing spring force. This can eventually lead to permanent deformation of the seal, resulting in loss of sealing.

SUMMARY OF THE INVENTION

In a featured embodiment, a seal for a gas turbine engine comprises a seal body extending from a first end to a second end. A wrap extends at least partially around the first and second ends of the seal body.

In another embodiment according to the previous embodiment, the seal body has a dog bone cross-sectional shape.

In another embodiment according to any of the previous embodiments, the seal body includes a central body portion extending between the first and second ends and defined by a first cross-sectional area. The first and second ends are defined by a second cross-sectional area that is greater than the first cross-sectional area.

In another embodiment according to any of the previous embodiments, the wrap extends between first and second wrap ends, and along the central body portion with the first wrap end wrapping at least partially around the first end of the seal body and the second wrap end wrapping at least partially around the second end of the seal body.

In another embodiment according to any of the previous embodiments, the first and second wrap ends extend around the first and second ends by at least sixty degrees.

In another embodiment according to any of the previous embodiments, the first and second wrap ends extend around the first and second ends within a range of 60 to 180 degrees.

In another embodiment according to any of the previous embodiments, the first and second wrap ends extend around the first and second ends within a range of 60 to 120 degrees.

In another embodiment according to any of the previous embodiments, the seal body comprises one of a full or split ring seal.

In another embodiment according to any of the previous embodiments, the wrap comprises one of a full or split ring.

In another embodiment according to any of the previous embodiments, the wrap is comprised of sheet metal.

In another embodiment according to any of the previous embodiments, the first end of the seal body is configured for engagement with a blade outer air seal. The second end of the seal body is configured for engagement with a vane platform. The seal body is moveable relative to the wrap.

In another featured embodiment, a gas turbine engine component comprises a blade outer air seal. A vane platform is positioned adjacent to the blade outer air seal. A seal assembly extends between the vane platform and the blade outer air seal. The seal assembly comprises a dog bone seal having first and second seal ends, and a wrap at least partially surrounding the first and second seal ends.

In another embodiment according to the previous embodiment, the wrap comprises a piece of sheet metal having a first wrap end extending around the first seal end of the dog bone seal and a second wrap end extending around the second seal end of the dog bone seal.

In another embodiment according to any of the previous embodiments, the first and second wrap ends extend around the first and second seal ends by at least sixty degrees.

In another embodiment according to any of the previous embodiments, the first and second wrap ends extend around the first and second seal ends within a range of 60 to 180 degrees.

In another embodiment according to any of the previous embodiments, the first and second wrap ends extend around the first and second seal ends within a range of 60 to 120 degrees.

In another embodiment according to any of the previous embodiments, the wrap is in direct abutting engagement with the dog bone seal. The first wrap end is in direct abutting engagement with the blade outer air seal and the second wrap end is in direct abutting engagement with the vane platform.

In another embodiment according to any of the previous embodiments, the vane and blade outer air seal are located within a turbine section of the gas turbine engine.

In another embodiment according to any of the previous embodiments, the dog bone seal is comprised of metal.

In another embodiment according to any of the previous embodiments, the wrap comprises a piece of sheet metal.

The foregoing features and elements may be combined in any combination without exclusivity, unless expressly indicated otherwise.

These and other features may be best understood from the following drawings and specification.

DETAILED DESCRIPTION

Figure 1:
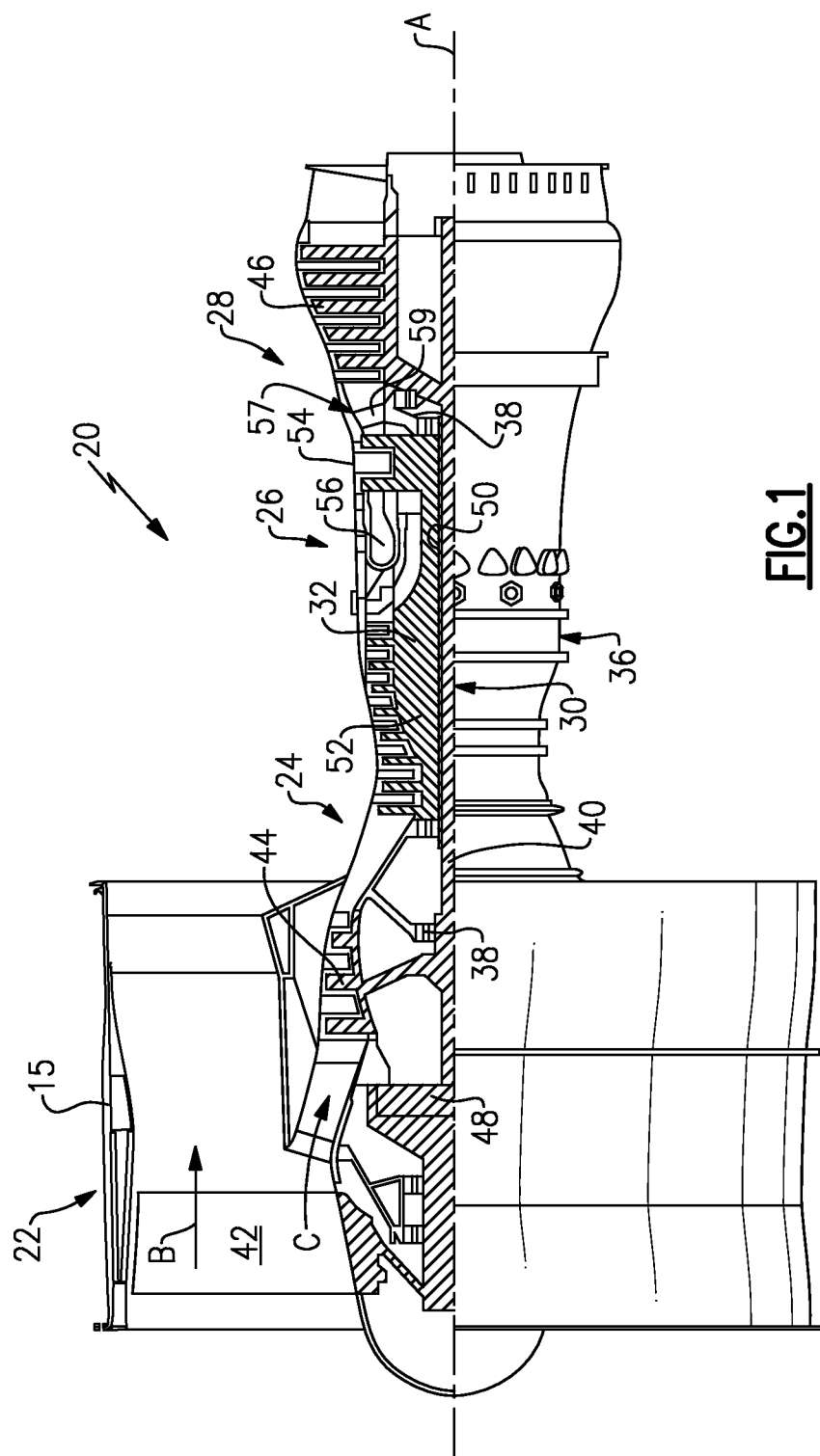
FIG. 1 is a schematic representation of one example of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ^\circ \text{R})/(518.7^\circ \text{R})]^{0.5}$. The "Low corrected fan tip speed" as disclosed herein according to one non-limiting embodiment is less than about 1150 ft/second.

Figure 2:
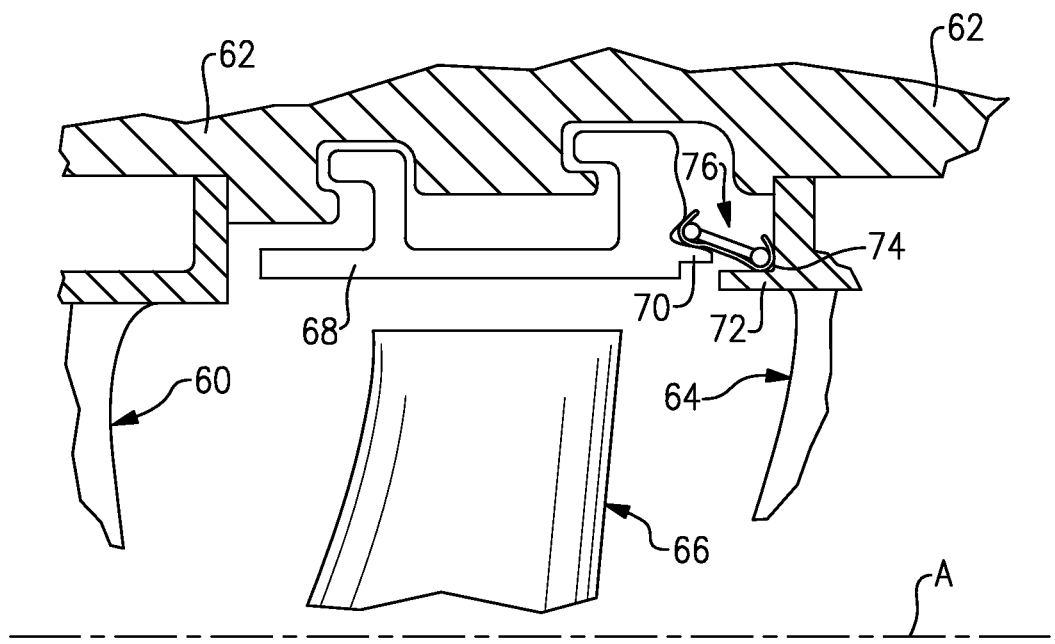
FIG. 2 is a schematic view of a blade outer air seal positioned between two sets of vanes and a seal assembly that incorporates the subject invention.

FIG. 2 shows a schematic view of a first set of turbine vanes 60 that is fixed to a casing portion 62 in a known manner. A second set of turbine vanes 64 is fixed to the casing portion 62 downstream or aft of the first set of turbine vanes 60. A set of rotating blades 66 is positioned axially between the first set of turbine vanes 60 and the second set of turbine vanes 64. A blade outer air seal 68, supported by the casing portion 62, is positioned radially outwardly of the blades 66 and axially between the vanes 60, 64.

The blade outer air seal 68 includes a first abutment portion 70 located on a radially inner portion of the blade outer air seal 68. Each vane 64 of the second set of vanes 64 is supported on a vane platform 72 that provides a second abutment portion 74. A seal assembly 76 is positioned to extend between the first 70 and second 74 abutment portions.

Figure 3:
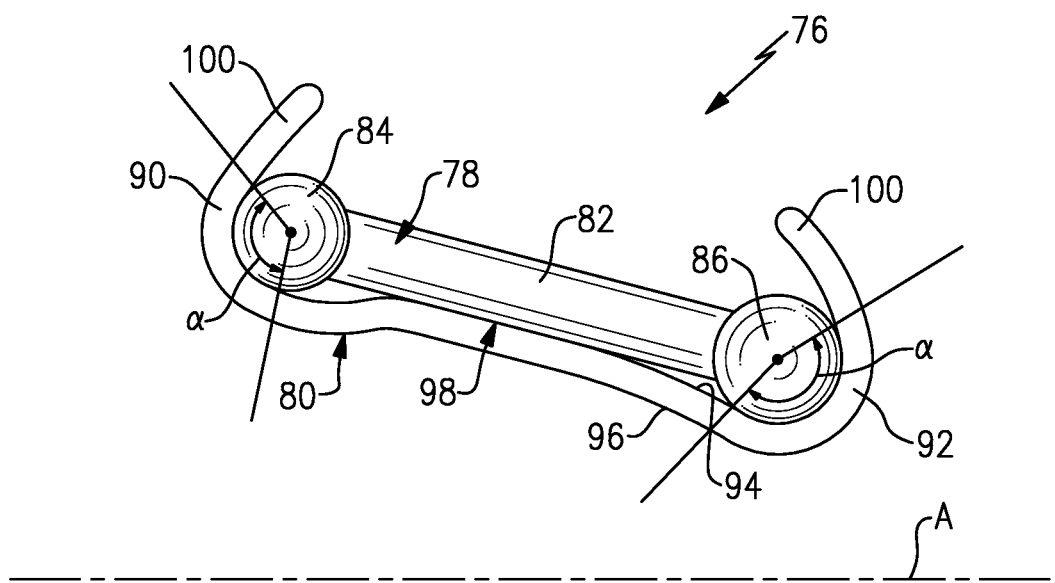
FIG. 3 is an enlarged view of the seal assembly of FIG. 2.

The seal assembly 76 comprises a two-piece seal having a seal body 78 and a wrap 80. The seal body 78 has a central body portion 82 and extends between a first seal end 84 and a second seal end 86. In one example shown in FIG. 3, the seal body 78 has a dog bone shape. In this configuration, the central body portion 82 is defined by a first cross-sectional area and the first 84 and second 86 seal ends are defined by a second cross-sectional area that is greater than the first cross-sectional area. In one example, the central body portion 82 comprises a generally linear portion and the first 84 and second 86 seal ends comprise enlarged bulbous end portions.

The wrap 80 extends between a first wrap end 90 and a second wrap end 92. The wrap 80 also includes a radially outer surface 94 and a radially inner surface 96. The wrap 80 makes contact with a significant portion of the central body portion 82 as indicated at 98 and wraps around the first 84 and second 86 seal ends. In wrapping around the seal ends 84, 86, the radially outer surface 94 of the wrap 80 is in direct abutting engagement with the surfaces of the first 84 and second 86 seal ends.

In one example, the wrap 80 extends at an angle α that is at least 60 degrees around the first 84 and/or second 86 seal ends. In a further example, the wrap extends around the first 84 and/or second 86 seal ends with a range of 60 to 120 degrees. Optionally, the range could be increased to 60 to 180 degrees or reduced to 60 to 90 degrees. Further, the range can be different for each seal end or can be the same.

In one example, the dog bone seal 78 is comprised of a metal material. The seal 78 can comprise either a full or split ring seal and includes a conical wall.

In one example, the wrap 80 is comprised of a thin sheet metal material. The sheet metal material is easily conformed to wrap around the ends 84, 86 of the seal body 78. The wrap 80 can be comprised as either a full or split ring.

The axial width of the unassembled seal may extend beyond the axial extent of a cavity that is being sealed by the seal assembly 76 such that when assembled the conical wall is forced to be in a more vertical direction as shown in FIG. 2 and thereby exerts an axial load across the cavity. Further, because the wrap 80 is a thin sheet meal piece, the wrap 80 provides a sealing surface that is compliant to circumferential variations in the surfaces 70, 74 being sealed. Further, this configuration accommodates cold interference in a radial direction too.

The wrap 80 includes extension portions 100 that extend radially beyond the first 84 and second 86 seal ends. In the example shown, the extension portions 100 extend radially outward from the seal ends 84, 86 in a direction toward the casing portion 62.

The subject two-piece seal assembly 76 provides a force between segmented abutting hardware, such as the BOAS 68 and vane platform 72 for example. The lack of conformance to the inter-segment gap of the segmented abutting hardware due to the dog bone shape is overcome by the ductility of the sheet metal wrap 80. Wear of the sheet metal does not compromise the spring force of the dog bone seal body 78 and the presence of the dog bone seal body 78 in the wear locations creates a greater tolerance to wear depth versus traditional W and M shaped seals at this location. In typical M or W seal configurations, a worn or fractured seal results in a significant loss in sealing of the cavity. The two-piece dog bone seal assembly 76 results in a less significant sealing loss from a worn or fractured wrap 80 because the dog bone seal body 78 still fills the cavity. Further, the additional axial force required to compress the dog bone seal body 78 provides more resilience from damage during assembly.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A seal for a gas turbine engine comprising:
a seal body extending from a first end to a second end; and
a wrap extending at least partially around and contacting the first and second ends of the seal body, wherein the wrap comprises a metal material,
wherein the seal body includes a central body portion extending between the first and second ends and defined by a first cross-sectional area, wherein the first and second ends are defined by a second cross-sectional area that is greater than the first cross-sectional area, and
wherein the wrap extends between first and second wrap ends, and wherein the wrap extends along the central body portion with the first wrap end wrapping at least partially around the first end of the seal body and the second wrap end wrapping at least partially around the second end of the seal body.

2. The seal according to claim 1 wherein the seal body has a dog bone cross-sectional shape.

3. The seal according to claim 1 wherein the first and second wrap ends are in contact with and extend around respective centers of the first and second ends of the seal body by an angle of at least sixty degrees, wherein the angle is defined as spanning between first and second points of contact between the seal body and the wrap.

4. The seal according to claim 3 wherein the first and second wrap ends are in contact with and extend around respective centers of the first and second ends of the seal body within a range of 60 to 120 degrees or within a range of 60 to 180 degrees.

5. The seal according to claim 1 wherein the seal body comprises one of a full or split ring seal.

6. The seal according to claim 1 wherein the wrap comprises one of a full or split ring.

7. The seal according to claim 1 wherein the wrap is comprised of sheet metal.

8. The seal according to claim 1 wherein the first end of the seal body comprises a blade outer air seal abutment and is configured for engagement with a blade outer air seal and the second end of the seal body comprises a vane platform abutment and is configured for engagement with a vane platform, and wherein the seal body is moveable relative to the wrap.

9. The seal according to claim 1 wherein the seal body defines an axis extending from the first end to the second end, and wherein the seal body is positioned within a cavity between a vane platform and a blade outer air seal, and wherein the seal exerts an axial load across the cavity.

10. The seal according to claim 9 wherein the first end is in direct engagement with the blade outer air seal and the second end is in direct engagement with the vane platform, and wherein one of the first and second ends is radially outward of the other of the first and second ends when positioned within the cavity.

11. A seal for a gas turbine engine comprising:
a seal body extending from a first end to a second end, wherein the seal body includes a central body portion extending between the first and second ends and defined by a first cross-sectional area, and wherein the first and second ends are defined by a second cross-sectional area that is greater than the first cross-sectional area; and
a wrap extending at least partially around the first and second ends of the seal body, and wherein the wrap extends between first and second wrap ends, and wherein the wrap extends along the central body portion with the first wrap end wrapping at least partially around the first end of the seal body and the second wrap end wrapping at least partially around the second end of the seal body; and
wherein the first and second wrap ends are in contact with and extend around respective centers of the first and second ends of the seal body within one of the following range of angles 60 to 180 degrees, or 60 to 120 degrees, wherein the angle is defined as spanning between first and second points of contact between the seal body and the wrap.

12. A gas turbine engine component comprising:
a blade outer air seal spaced radially outward of an engine central longitudinal axis;
a vane platform positioned adjacent to the blade outer air seal to define a cavity therebetween; and
a seal assembly extending across the cavity between the vane platform and the blade outer air seal, the seal assembly comprising a dog bone seal having first and second seal ends, and a wrap at least partially surrounding and contacting the first and second seal ends; and
wherein the dog bone seal includes a central body portion extending between the first and second seal ends and defined by a first cross-sectional area, and wherein the first and second seal ends are defined by a second cross-sectional area that is greater than the first cross-sectional area, and wherein the wrap extends between first and second wrap ends, and wherein the wrap extends along the central body portion with the first wrap end wrapping at least partially around the first seal end and the second wrap end wrapping at least partially around the second seal end.

13. The gas turbine engine component according to claim 12 wherein the wrap comprises a piece of sheet metal having a first wrap end extending around the first seal end of the dog bone seal and a second wrap end extending around the second seal end of the dog bone seal.

14. The gas turbine engine component according to claim 13 wherein the first and second wrap ends are in contact with and extend around respective centers of the first and second seal ends by an angle of at least sixty degrees, wherein the angle is defined as spanning between first and second points of contact between the dog bone seal and the wrap.

15. The gas turbine engine component according to claim 14 wherein the first and second wrap ends are in contact with and extend around respective centers of the first and second seal ends within a range of 60 to 180 degrees.

16. The gas turbine engine component according to claim 14 wherein the first and second wrap ends are in contact with and extend around respective centers of the first and second seal ends within a range of 60 to 120 degrees.

17. The gas turbine engine component according to claim 13 wherein the wrap is in direct abutting engagement with the dog bone seal, and wherein the first wrap end is in direct abutting engagement with the blade outer air seal and the second wrap end is in direct abutting engagement with the vane platform.

18. The gas turbine engine component according to claim 12 wherein the vane and blade outer air seal are located within a turbine section of the gas turbine engine.

19. The gas turbine engine component according to claim 12 wherein the dog bone seal is comprised of metal.

20. The gas turbine engine component according to claim 19 wherein the wrap comprises a piece of sheet metal.

21. The gas turbine engine component according to claim 12 wherein the first and second wrap ends are in contact with and extend around respective centers of the first and second ends of the dog bone seal within one of the following range of angles 60 to 180 degrees, or 60 to 120 degrees, wherein the angle is defined as spanning between first and second points of contact between the dog bone seal and the wrap.

22. The gas turbine engine component according to claim 12 wherein the cavity is defined by a cavity axial length extending in a direction along the engine central longitudinal axis and the seal assembly is defined by a seal axial length extending in the direction along the engine central longitudinal axis, and wherein the seal axial length is greater than the cavity axial length such that the seal assembly exerts an axial load across the cavity and has one of the first and second seal ends radially outward of the other of the first and second seal ends when positioned within the cavity.

* * * * *